United States Patent
Willis

(10) Patent No.: US 6,250,654 B1
(45) Date of Patent: Jun. 26, 2001

(54) CAR SEAT/STROLLER ASSEMBLY WITH ROCKER MECHANISM

(76) Inventor: William N. Willis, 5191 Deer Run Dr., Zolfo Springs, FL (US) 33890

( * ) Notice: Subject to any disclaimer, the term of this patent is extended or adjusted under 35 U.S.C. 154(b) by 0 days.

(21) Appl. No.: 09/546,297

(22) Filed: Apr. 10, 2000

(51) Int. Cl.$^7$ ....................................................... B62B 7/14
(52) U.S. Cl. ........................................... 280/47.41; 280/30
(58) Field of Search ............................... 280/47.4, 47.38, 280/79.2, 642, 647, 650, 658, 30, 31, 47.41, 641, 643, 657; 297/250.1, 255, 256.16, 256.1, 241; 16/DIG. 4, 112, 332; 5/416, 413; 403/92, 102; 180/166

(56) References Cited

U.S. PATENT DOCUMENTS

| | | | |
|---|---|---|---|
| 1,480,451 | * | 1/1924 | Koch ........................................ 280/30 |
| 1,508,500 | * | 9/1924 | Bingen et al. . |
| 3,806,117 | * | 4/1974 | Foster ..................................... 272/86 |
| 4,537,414 | * | 8/1985 | Nusbaum .......................... 280/47.41 |
| 5,188,380 | * | 2/1993 | Tucek . |
| 5,499,831 | * | 3/1996 | Worth et al. ........................... 280/30 |
| 5,562,548 | * | 10/1996 | Pinch et al. .......................... 472/119 |
| 5,772,279 | * | 6/1998 | Johnson, Jr. ......................... 297/130 |
| 5,947,555 | * | 9/1999 | Welsh, Jr. et al. ................... 297/130 |

\* cited by examiner

Primary Examiner—Brian L. Johnson
Assistant Examiner—Tony Winner
(74) Attorney, Agent, or Firm—Joseph N. Breaux

(57) ABSTRACT

A car seat/stroller assembly with rocking mechanism that combines a car seat, a stroller and a spring motor driven rocking swing into one system of interconnectable assemblies.

1 Claim, 4 Drawing Sheets

CAR SEAT/STROLLER ASSEMBLY WITH ROCKER MECHANISM

TECHNICAL FIELD

The present invention relates to child care devices and more particularly to a car seat/stroller assembly with rocker mechanism that includes a detachable car seat assembly and a stroller assembly; the stroller assembly including a chassis with four wheels and a pushing handle, two car seat docking supports extending upward from the chassis and including a seat support docking pin, and a spring motor driven rocking mechanism mounted on one of the car seat docking supports and including a mounting plate attachment member extending from a drive shaft thereof; the detachable car seat assembly including a car seat structure having a mounting plate attached to two opposed sides thereof, each mounting plate including a seat support pin receiving notch for sliding receiving and retaining therein a seat support docking pin and being rigidly attached to the car seat structure such that the weight of the car seat structure is supported by the two mounting plates when each mounting plate is rockably supported on one of the two support docking pins; one of the mounting plates including a cavity for receiving an engaging end of the mounting plate attachment member of the spring motor driven rocking mechanism; the spring motor driven rocking mechanism being operable to impart an oscillating motion to the mounting plate attachment member.

BACKGROUND ART

Child care givers are often confronted with carrying and transporting a large variety of devices needed when caring for a child. The device typically include a car seat, a stroller and, often times, a spring motor driven rocking child swing. Because it can be difficult to transport all of the items, it would be a benefit to have a system that combined a car seat, a stroller and a spring motor driven rocking swing.

GENERAL SUMMARY DISCUSSION OF INVENTION

It is thus an object of the invention to provide a car seat/stroller assembly with rocker mechanism that includes a detachable car seat assembly and a stroller assembly; the stroller assembly including a chassis with four wheels and a pushing handle, two car seat docking supports extending upward from the chassis and including a seat support docking pin, and a spring motor driven rocking mechanism mounted on one of the car seat docking supports and including a mounting plate attachment member extending from a drive shaft thereof; the detachable car seat assembly including a car seat structure having a mounting plate attached to two opposed sides thereof, each mounting plate including a seat support pin receiving notch for sliding receiving and retaining therein a seat support docking pin and being rigidly attached to the car seat structure such that the weight of the car seat structure is supported by the two mounting plates when each mounting plate is rockably supported on one of the two support docking pins; one of the mounting plates including a cavity for receiving an engaging end of the mounting plate attachment member of the spring motor driven rocking mechanism; the spring motor driven rocking mechanism being operable to impart an oscillating motion to the mounting plate attachment member.

Accordingly, a car seat/stroller assembly with rocker mechanism is provided. The car seat/stroller assembly with rocker mechanism includes a detachable car seat assembly and a stroller assembly; the stroller assembly including a chassis with four wheels and a pushing handle, two car seat docking supports extending upward from the chassis and including a seat support docking pin, and a spring motor driven rocking mechanism mounted on one of the car seat docking supports and including a mounting plate attachment member extending from a drive shaft thereof; the detachable car seat assembly including a car seat structure having a mounting plate attached to two opposed sides thereof, each mounting plate including a seat support pin receiving notch for sliding receiving and retaining therein a seat support docking pin and being rigidly attached to the car seat structure such that the weight of the car seat structure is supported by the two mounting plates when each mounting plate is rockably supported on one of the two support docking pins; one of the mounting plates including a cavity for receiving an engaging end of the mounting plate attachment member of the spring motor driven rocking mechanism; the spring motor driven rocking mechanism being operable to impart an oscillating motion to the mounting plate attachment member.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
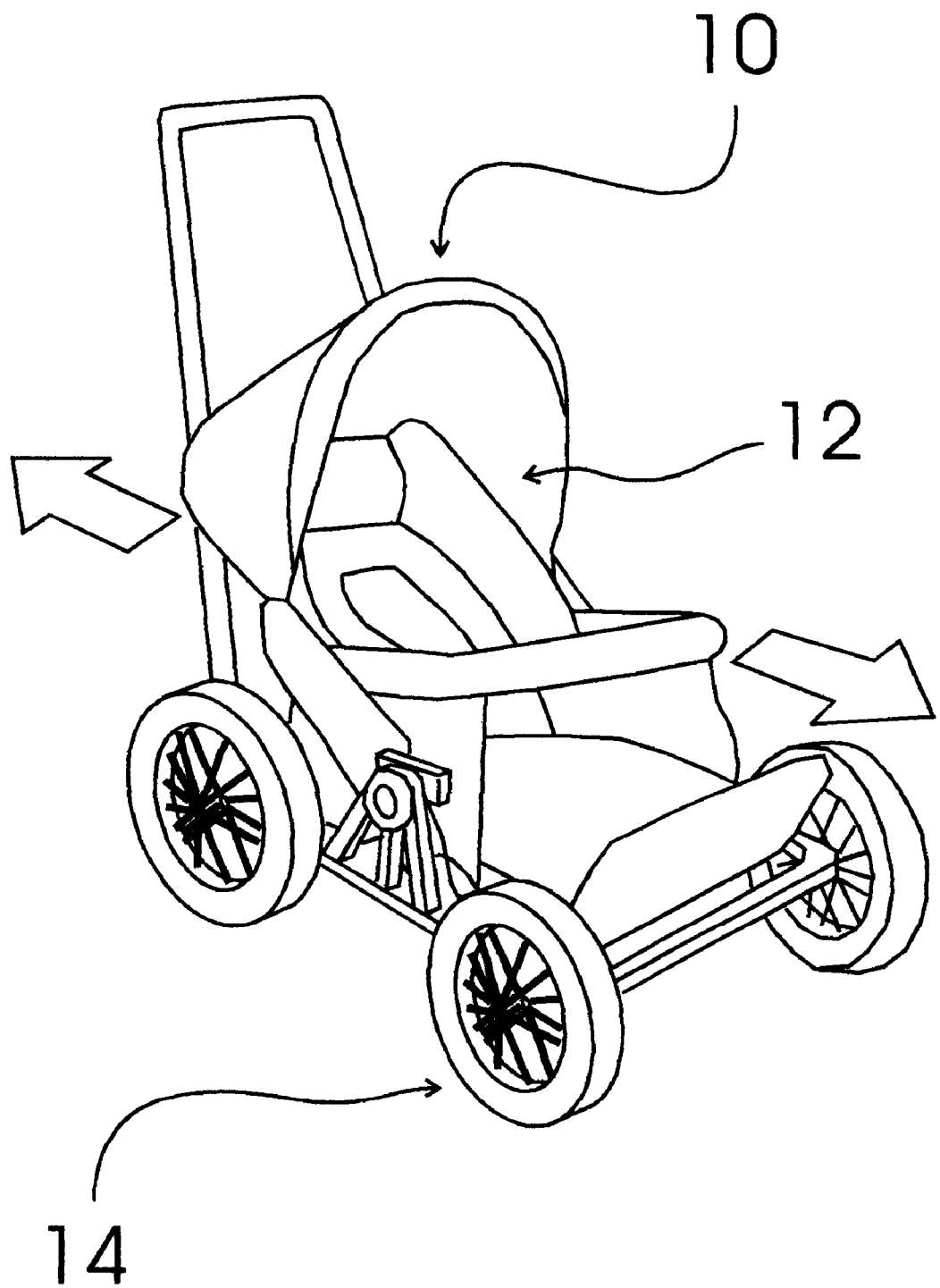
FIG. 1 is a perspective view of an exemplary embodiment of the car seat/stroller assembly with rocker mechanism showing the detachable car seat assembly and the stroller assembly; the stroller assembly including a chassis with four wheels and a pushing handle, two car seat docking supports extending upward from the chassis and including a seat support docking pin, and a spring motor driven rocking mechanism mounted on one of the car seat docking supports and including a mounting plate attachment member extending from a drive shaft thereof; the detachable car seat assembly including a car seat structure having a mounting plate attached to two opposed sides thereof, each mounting plate including a seat support pin receiving notch for sliding receiving and retaining therein a seat support docking pin and being rigidly attached to the car seat structure such that the weight of the car seat structure is supported by the two mounting plates when each mounting plate is rockably supported on one of the two support docking pins; one of the mounting plates including a cavity for receiving an engaging end of the mounting plate attachment member of the spring motor driven rocking mechanism; the spring motor driven rocking mechanism being operable to impart an oscillating motion to the mounting plate attachment member.
Figure 2:
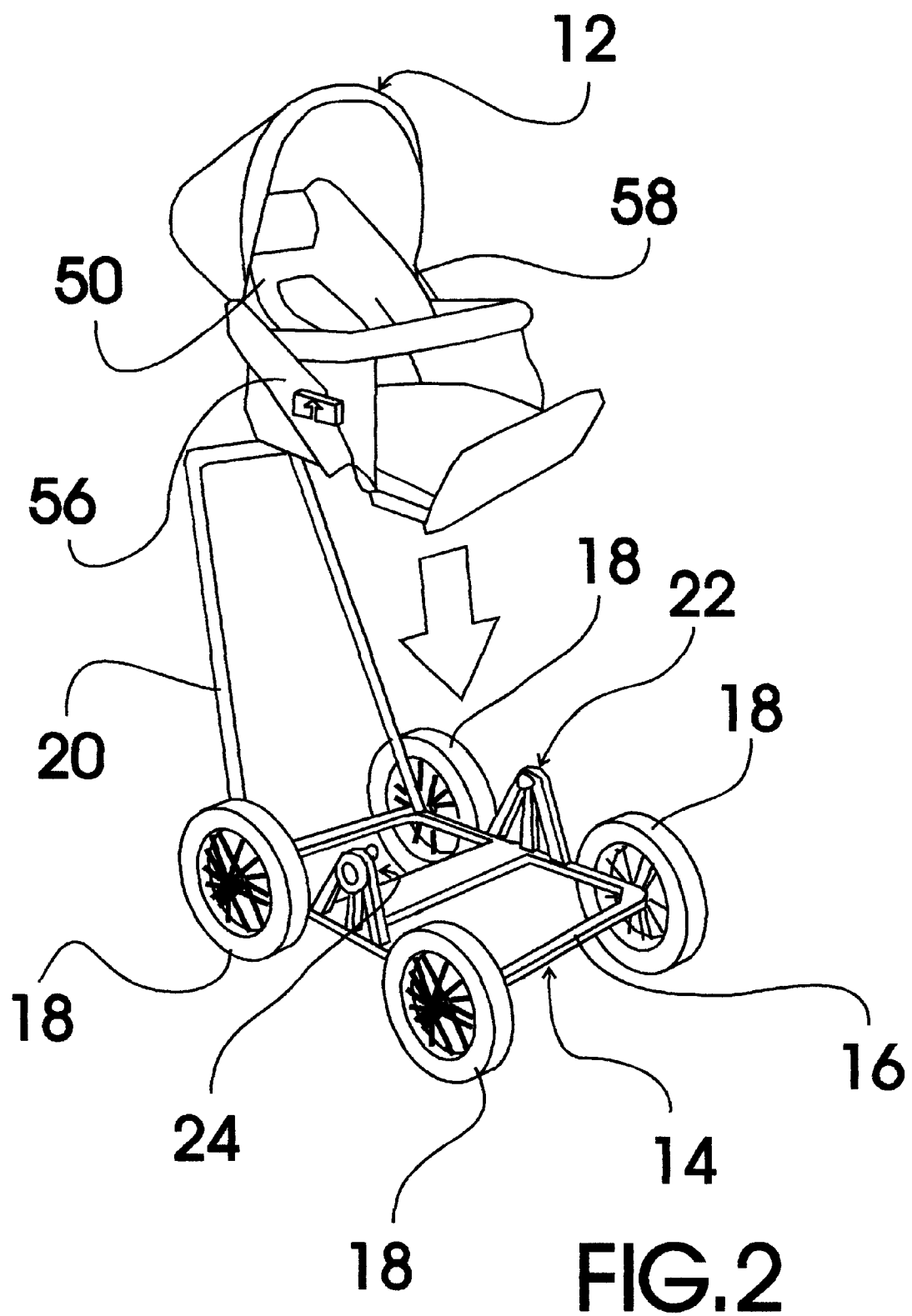
FIG. 2 is an exploded perspective view of the exemplary car seat/stroller assembly with rocker mechanism of FIG. 1.
Figure 3:
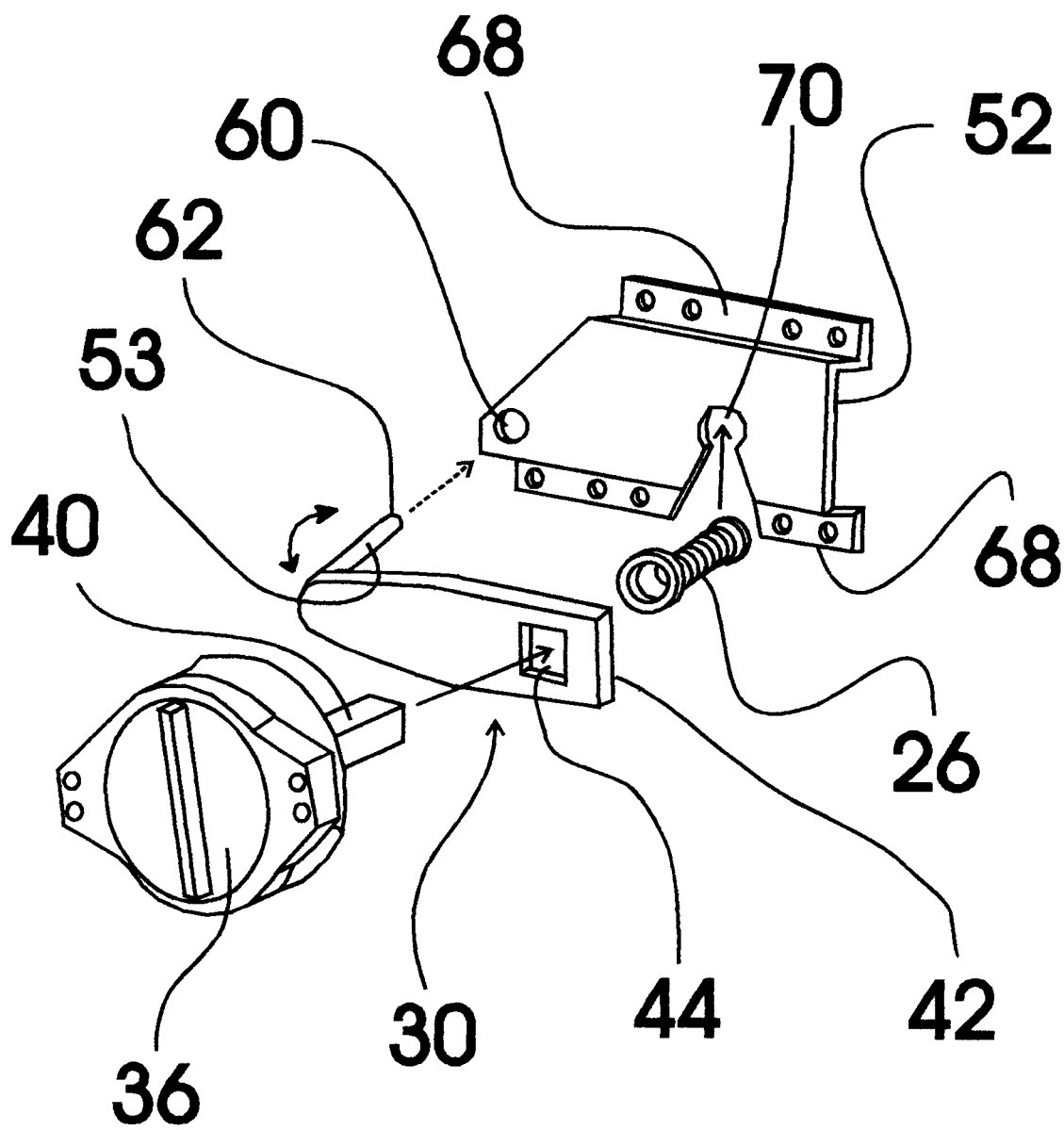
FIG. 3 is an exploded perspective view of the rocker mechanism and one of the mounting plates.
Figure 4:
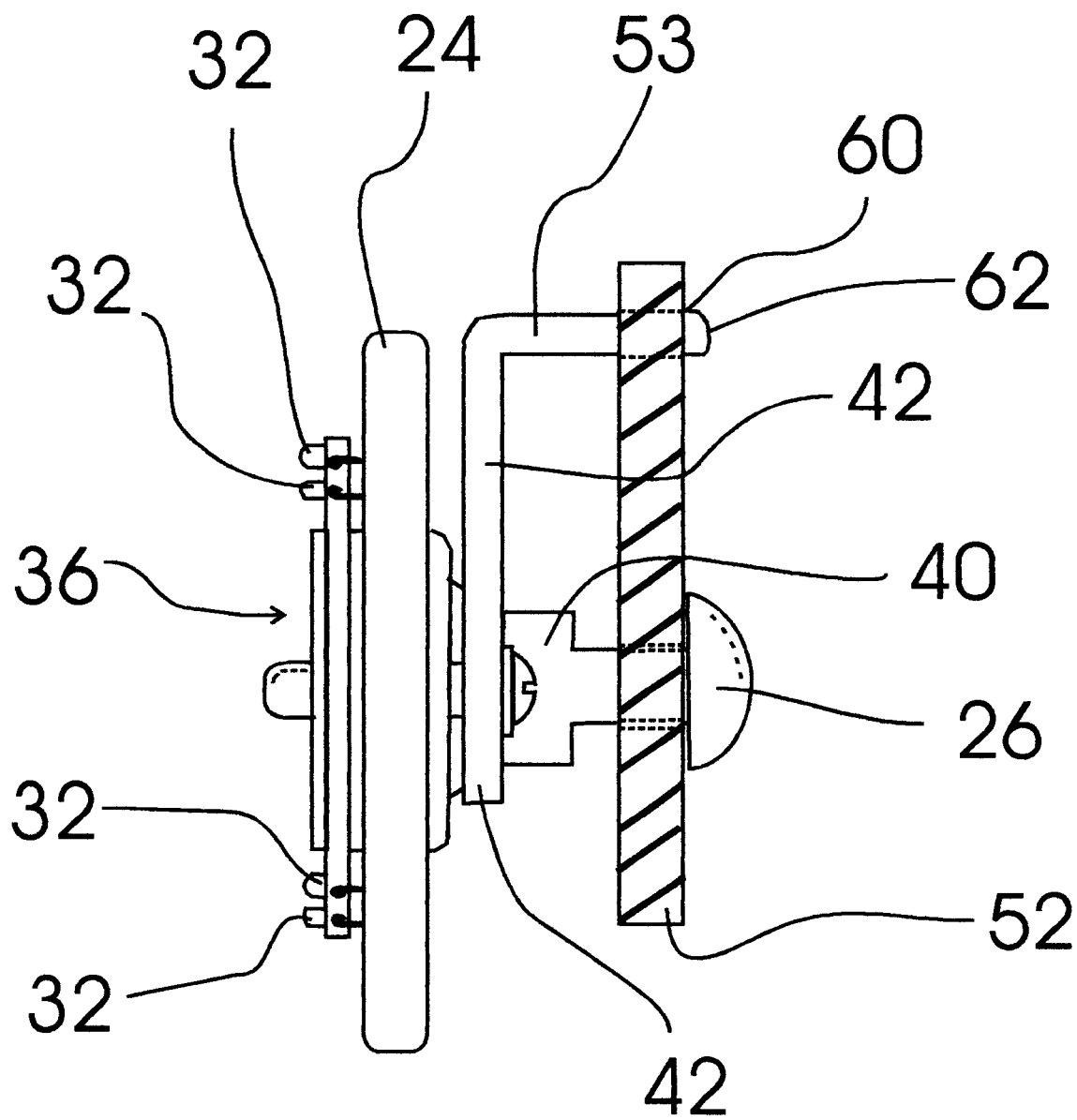
FIG. 4 is a top plan, partial-cutaway view of the rocker mechanism in connection with the mounting plate; the mounting plate having the seat attachment strips removed to show the enlarged head end of the support docking pin.

FIGS. 1–4 show various aspects of an exemplary embodiment of the a car seat/stroller assembly with rocker mechanism generally designated 10. Car seat/stroller assembly with rocker mechanism 10 includes a detachable car seat assembly, generally designated 12, and a stroller assembly, generally designated 14.

Stroller assembly 14 including a chassis 16 with four wheels 18, a pushing handle 20, and two car seat docking supports, generally designated 22,24 respectively, extending upward from chassis 16. Each car seat docking support 22,24 includes a seat support docking pin 26. A spring motor driven rocking mechanism, generally designated 30, is mounted to car seat docking support 24 with four securing screws 32. Spring motor driven rocking mechanism 30 includes a windable spring motor 36 having a winding knob 38 and a square shaped, oscillating drive shaft 40 and a mounting plate attachment member 42. Mounting plate attachment member 42 is a rigid planar metal member having a square shaped drive shaft keyway formed therethrough for coupling mounting plate attachment member 42 to oscillating drive shaft 40 and a rigid, cylinder shaped, mounting plate attachment member 53 extending perpendicularly from the planar metal member.

Detachable car seat assembly 12 includes a car seat structure 50 having a mounting plate, generally designated 52,54, attached to each of two opposed sides 56,58 thereof. Each mounting plate 54 is a mirror image of mounting plate 52 except that mounting plate 52 has a circular cavity 60 for receiving an engaging end 62 of mounting plate attachment member 53. Mounting plates 52,54 both include two securing strips 68 that are used to rigidly secure mounting plate 52,54 to an opposed side 56,58 of car seat structure 50; and a seat support pin receiving notch 70 for sliding receiving and retaining therein a seat support docking pin 26. When spring motor driven rocking mechanism 30 is in operation, spring motor 36 imparts an oscillating rocking motion to mounting plate attachment member 42 which is mechanically communicated to car seat structure 50. Car seat structure 50 may be detached from stroller assembly 14 and used in a vehicle.

It can be seen from the preceding description that a car seat/stroller assembly with rocker mechanism has been provided.

It is noted that the embodiment of the car seat/stroller assembly with rocker mechanism described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A car seat/stroller assembly with rocker mechanism comprising:

a detachable car seat assembly; and a stroller assembly;

said stroller assembly including a chassis with four wheels and a pushing handle, two car seat docking supports extending upward from said chassis and including a seat support docking pin, and a spring motor driven rocking mechanism mounted on one of said car seat docking supports and including a mounting plate attachment member extending from a drive shaft thereof;

said detachable car seat assembly including a car seat structure having a mounting plate attached to two opposed sides thereof, each mounting plate including a seat support pin receiving notch for sliding receiving and retaining therein a seat support docking pin and being rigidly attached to said car seat structure such that said car seat structure is supported by said two mounting plates when each mounting plate is rockably supported on one of said two support docking pins;

one of said mounting plates including a cavity for receiving an engaging end of said mounting plate attachment member of said spring motor driven rocking mechanism;

said spring motor driven rocking mechanism being operable to impart an oscillating motion to said mounting plate attachment member.

\* \* \* \* \*